L. W. MELCHER.
TRACTION WHEEL.
APPLICATION FILED OCT. 25, 1917.
1,305,229.
Patented May 27, 1919
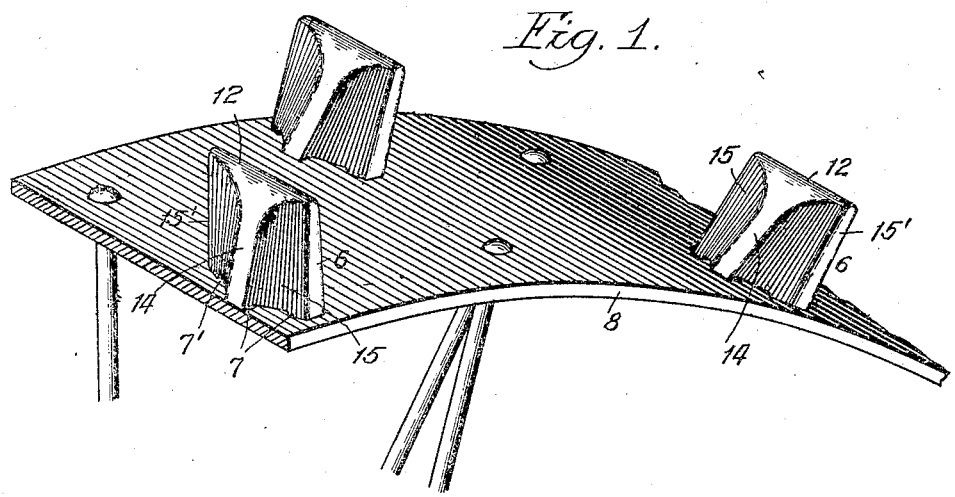
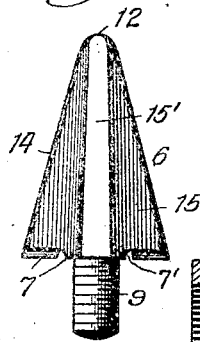
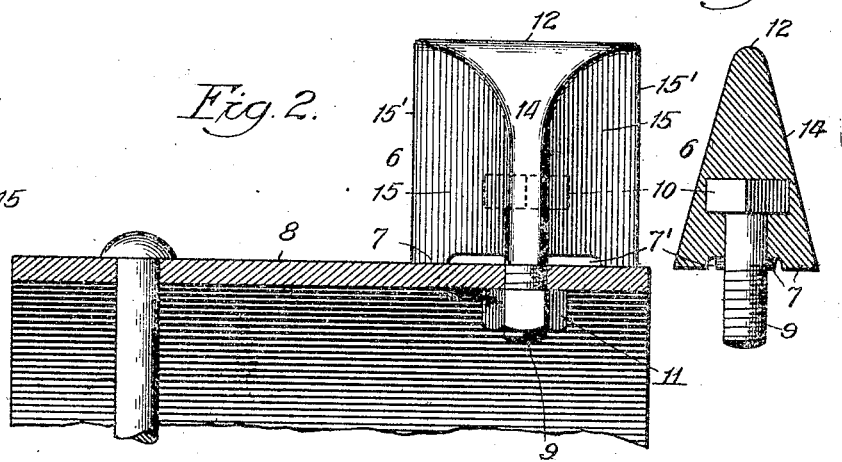
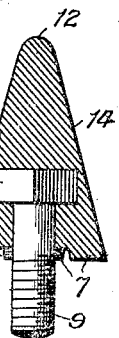
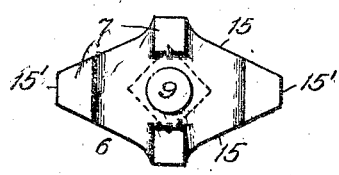
Witness:
John Enders
Inventor
Lee W. Melcher
by Fred Gerlach
his Atty.

UNITED STATES PATENT OFFICE.

LEE W. MELCHER, OF LA CROSSE, WISCONSIN, ASSIGNOR TO LA CROSSE TRACTOR CO., OF LA CROSSE, WISCONSIN, A CORPORATION OF DELAWARE.

TRACTION-WHEEL.

1,305,229.

Specification of Letters Patent.  Patented May 27, 1919.

Application filed October 25, 1917. Serial No. 198,378.

*To all whom it may concern:*

Be it known that I, LEE W. MELCHER, a citizen of the United States, and a resident of La Crosse, in the county of La Crosse and State of Wisconsin, have invented certain new and useful Improvements in Traction-Wheels, of which the following is a full, clear, and exact description.

The invention relates to traction wheels of the type usually employed on tractors, and more particularly to lugs adapted to be applied to the rim of the wheel when the tractor is being used for plowing or in soft soil.

One object of the invention is to provide an improved traction lug which will not clog and in which the maximum area or surface is provided for coming in contact with the ground to render the lug effective in causing the traction wheels to grip the soil. Heretofore, it has been customary to employ lugs that are conoidal or pyramidal and the present invention provides a lug which is elongated laterally to offer great resistance to the ground. Another object of the invention is to provide an improved traction lug which can be produced at a low cost and easily applied to the rim of a traction wheel and which, when applied, will be effectively secured to the rim of the wheel.

The invention consists in the several novel features hereinafter set forth and more particularly defined by claims at the conclusion hereof.

In the drawings: Figure 1 is a perspective of a portion of the traction-wheel embodying the invention. Fig. 2 is a front elevation of a lug, the rim of the wheel being shown in section. Fig. 3 is a side elevation of the lug. Fig. 4 is a central section and Fig. 5 is a bottom view.

The improved lug comprises a body portion 6 formed of a casting, and has lugs or feet 7 adapted to engage the outer periphery of the rim 8 of the traction wheel. A screw bolt 9 is provided with a head 10 which is embedded in body 6, the latter being cast around the head and a portion of the shank of the bolt. The bolt extends beyond the lugs 7 and is adapted to extend through the wheel-rim so that when a nut 11 is clamped against the inner face of the rim, the entire lug will be securely fixed to the traction wheel. By casting the body around the bolt, they are permanently secured together, so that when the lugs are not in use, the bolts and lugs will remain connected. By providing lugs 7 to engage the outer periphery of the rim in lieu of providing a surface which conforms entirely to the curvature of the rim, the lug will be firmly seated on the rim, so that it will not be displaced in use, and furthermore, the spaces 7' between the lugs permit dirt to pass between the lug and the rim so that it will not pack into the corners between the lug and the rim.

The lug-body 6 is comparatively wide, while in plane of rotation of the wheel it is only of sufficient thickness to give the desired strength to the lug. This provides the maximum surface on the lug which is adapted to engage the ground and avoids a shallow angle between the periphery of the rim and the operative face of the lug. The central portion 14 of the lug is tapered upwardly and inwardly from the bottom to the edge 12 and transversely, and the lug is tapered, as at 15, from its medial portion to its sides, to deflect the soil laterally. The sides 15' of the lug are straight. This form of lug has been found to be substantially self-cleaning and efficient in service.

The invention exemplifies a traction lug which is formed with efficient gripping surfaces and consists of a casting with a wrought iron bolt cast into it so that it can be quickly and readily attached or detached from a wheel rim. Also one which provides a maximum transverse surface for engaging the ground and can be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A traction lug for tractors comprising a body provided with a transversely extending outer edge, a base to engage the rim of the wheel and a transversely extending bearing face, tapered from the base to the outer edge and reversely tapered from its center to the sides, and means to secure the lug to the wheel.

2. A traction lug for tractors comprising a body provided with a transversely extending outer edge, a base to engage the rim of the wheel, and front and rear bearing faces tapered from the base to the outer edge and each reversely tapered from its center to the sides, and means to secure the lug to the wheel.

3. A traction lug for tractors comprising a body provided with a transversely extending outer edge, a base, and a tapered bearing face, the base having integral lugs spaced apart to leave longitudinal spaces therebetween for engaging the wheel rim, and means to secure the lug to the wheel.

LEE W. MELCHER.